United States Patent
Frerichs et al.

(10) Patent No.: US 11,061,546 B2
(45) Date of Patent: Jul. 13, 2021

(54) LABORATORY APPARATUS WITH A CONTROL DEVICE

(71) Applicant: Eppendorf AG, Hamburg (DE)

(72) Inventors: Jan-Gerd Frerichs, Norderstedt (DE); Andreas Thieme, Hamburg (DE); Wolf Wente, Hamburg (DE); Reza Hashemi, Hanstedt (DE); Sven Lüdicke, Hamburg (DE); Martin Poggenclaas, Hamburg (DE)

( * ) Notice: Subject to any disclaimer, the term of this patent is extended or adjusted under 35 U.S.C. 154(b) by 239 days.

(21) Appl. No.: 14/651,612

(22) PCT Filed: Dec. 5, 2013

(86) PCT No.: PCT/EP2013/075718
§ 371 (c)(1),
(2) Date: Jun. 11, 2015

(87) PCT Pub. No.: WO2014/090687
PCT Pub. Date: Jun. 19, 2014

(65) Prior Publication Data
US 2015/0324104 A1 Nov. 12, 2015

Related U.S. Application Data

(60) Provisional application No. 61/737,151, filed on Dec. 14, 2012.

(30) Foreign Application Priority Data

Dec. 14, 2012 (DE) ............... 10 2012 112 312.8

(51) Int. Cl.
*G06F 3/0484* (2013.01)
*G06F 3/01* (2006.01)
(Continued)

(52) U.S. Cl.
CPC ........ *G06F 3/04847* (2013.01); *B01L 3/0237* (2013.01); *B01L 7/52* (2013.01);
(Continued)

(58) Field of Classification Search
CPC ............... G06F 3/04847; G06F 3/0488; G06F 3/04842; G06F 3/017; G06F 3/0482; G01N 35/00584
See application file for complete search history.

(56) References Cited

U.S. PATENT DOCUMENTS 6,229,456 B1 * 5/2001 Engholm ................. 341/35
7,877,707 B2 * 1/2011 Westerman ......... G06F 3/04883
715/863

(Continued)

FOREIGN PATENT DOCUMENTS

DE 100 13 666 A1 10/2001

OTHER PUBLICATIONS

Drummond, James R.: "PHY 406-Microprocessor Interfacing Techniques PHY 406-Microprocessor Interfacing Techniques—LabVIEW Tutorial—Part I—Beginning at the Beginning", Sep. 30, 2006, pp. 1-10, Retrieved from the Internet on Feb. 7, 2014; URL:http://www.upscale.utoronto.ca/General Interest/Drummond/LabVIEW/tut_1.pdf.

(Continued)

*Primary Examiner* — Shen Shiau
(74) *Attorney, Agent, or Firm* — Todd A. Lorenz

(57) ABSTRACT

For the simplified, intuitive and reliable operation of laboratory apparatuses, it is proposed that the laboratory apparatus be equipped with a control device comprising a touch-sensitive display unit (100), wherein the display unit (100) is configured to display a plurality of control elements (111, 112, 113 etc), which are assigned to different control functions of the laboratory apparatus, wherein the control ele- (Continued)

ments are embodied (111, 112, 113 etc) to set parameters (121, 122, 123) of the control functions. At the same time, at least two of the control elements (111, 112, 113, 114) are assigned to the same control function and embodied differently for setting the same parameter (121) of this control function. Therefore, the user is always offered a plurality of ways for setting a parameter or for operating the apparatus, such as, for example, for setting the rotational speed of a centrifuge. The touch-sensitive display unit is preferably embodied as a multi-touch screen, which is also able to recognise finger movements of the user, so-called gestures, as operator commands.

9 Claims, 14 Drawing Sheets

(51) Int. Cl.
*G06F 3/0482* (2013.01)
*G06F 3/0488* (2013.01)
*B01L 7/00* (2006.01)
*G01N 35/00* (2006.01)
*B01L 99/00* (2010.01)
*B01L 3/02* (2006.01)
*G06F 3/00* (2006.01)

(52) U.S. Cl.
CPC .............. *B01L 99/00* (2013.01); *G01N 35/00* (2013.01); *G01N 35/00584* (2013.01); *G06F 3/00* (2013.01); *G06F 3/017* (2013.01); *G06F 3/0482* (2013.01); *G06F 3/0488* (2013.01); *G06F 3/04842* (2013.01); *B01L 2200/087* (2013.01); *B01L 2300/027* (2013.01); *G01N 2035/0091* (2013.01)

(56) References Cited

U.S. PATENT DOCUMENTS

| | | | | |
|---|---|---|---|---|
| 9,207,776 B2* | 12/2015 | Jiang | ..................... | G06F 3/0236 |
| 2011/0071818 A1* | 3/2011 | Jiang | ..................... | G06F 3/0236 |
| 2012/0130547 A1* | 5/2012 | Fadell | ................ | G05D 23/1917 |
| | | | | 700/276 |
| 2012/0131504 A1* | 5/2012 | Fadell | ................. | F24D 19/1084 |
| | | | | 715/810 |
| 2012/0203379 A1* | 8/2012 | Sloo | ..................... | G06F 3/0482 |
| | | | | 700/276 |
| 2013/0141018 A1* | 6/2013 | Kamii | ................ | H05B 33/0863 |
| | | | | 315/360 |
| 2013/0194228 A1* | 8/2013 | Tuzar | ..................... | B60K 37/06 |
| | | | | 345/174 |
| 2013/0249814 A1* | 9/2013 | Zeng | ..................... | G06F 3/0488 |
| | | | | 345/173 |

OTHER PUBLICATIONS

Anonymous, "Designing Custom User Interfaces in NI LabVIEW for Your NI USB-TCO1", Aug. 3, 2012 (Aug. 3, 2012), pp. 1-4, Retrieved from the Internet on Oct. 2, 2014; URL:http://www.ni.com/white-paper/10728/en /pdf.

Anonymous, "Front Panel Controls and Indicators—LabVIEW 2012 Help—National Instruments", Jun. 30, 2012 , pp. 1-7, Retrieved from the Internet on Jul. 2, 2014; URL:http://zone.ni.com/reference/en-XX/hel p/371361J-01/1vconcepts/fp_controls_indicators/.

* cited by examiner

LABORATORY APPARATUS WITH A CONTROL DEVICE

The invention relates to a laboratory apparatus with a control device according to the preamble to claim 1. In particular, the invention relates to a laboratory apparatus equipped with a touch-sensitive display unit, which is used to activate and/or control control functions of the laboratory apparatus. In addition, the invention relates to a control device for at least one laboratory apparatus, in particular for the operation of a plurality of laboratory apparatuses.

Laboratory apparatuses are usually equipped with control devices and control elements made up of individual components, such as buttons, keys, potentiometers or the like. Membrane keypads are also frequently used to set parameters, such as, for example, temperature, speed of rotation etc. The parameters relate to different control functions, which are also dependent on the type of laboratory apparatus in question. Examples of typical laboratory apparatuses include centrifuges, spectrometers, mixers, shakers, freezers, thermocyclers or incubators. The parameter set in each case is frequently displayed together with further information on the status of the apparatus. The display unit used can be, for example, a matrix display or the display panel of a full-graphic display; laboratory apparatuses are also known which only comprise simple illuminated displays (for example LEDs) on the control elements (for example backlit keys). Therefore, the known display panels are used for man-machine communication and are generally sufficient for simple apparatuses. Operation is achieved via control elements, such as, for example, keys, switches, potentiometers and the like. However, there is no suitable control and display option for more efficient operation or to display complex contents. In addition, more complex apparatuses frequently require numerous keys (for example to input alphanumeric information) or complicated control concepts with multiple control-element assignment.

Laboratory apparatuses are known already which are equipped with a control device and have a touch-sensitive display unit in the form of a so-called touch screen, wherein the display unit is configured to display a plurality of control elements in the form of so-called soft buttons or soft keys. The control elements are assigned to different control functions of the laboratory apparatus, wherein the control elements are embodied to set parameters of the control functions such as, for example, to set a rotational speed for the electric motor drive of a centrifuge.

During the operation of the laboratory apparatuses under everyday conditions of use, as a rule, capacitive touch screens are not used since they cannot be operated reliably when wearing gloves, even laboratory gloves. Instead, it is more common to use resistive touch screens which respond to pressure. Therefore, their operation, in particular with frequent operation in everyday laboratory practice, is extremely laborious and awkward and hence not ergonomic. The operation of capacitive touch screens can in turn be problematic because the staff operating the laboratory apparatuses frequently have to set the parameters while wearing moist laboratory gloves. Even the first contact with the touch screens can result in incorrect settings which then have to be promptly corrected. This again complicates and slows down the sequence of laboratory processes.

It is therefore the object of the invention to overcome said drawbacks. In particular, the object is to provide a laboratory apparatus with a control device comprising a touch-sensitive display unit which is suitable for simplified, intuitive, reliable and ergonomic operation.

The object is achieved with a laboratory apparatus with the features of claim 1. This claim suggests a laboratory apparatus with a control device comprising a touch-sensitive display unit, wherein the display unit is configured to display a plurality of control elements, which are assigned to different control functions of the laboratory apparatus, wherein the control elements are embodied to set parameters of the control functions. The laboratory apparatus is characterized by a display unit with which at least two of the control elements are assigned to the same control function and are embodied differently to set the same parameter of this control function.

Accordingly, at least two different control elements are available on the display unit for the operation of the same control function and to set the same (central) parameter so that the operator in the laboratory is provided with at least two alternative setting options for the same parameter. Hence, the user will always be provided with a plurality of ways for setting a parameter or for the operation of the apparatus, such as, for example, setting the rotational speed of a centrifuge. Preferably, the touch-sensitive display unit is embodied as a multi-touch screen, which is also able to recognise finger movements by the user, so-called gestures, as operator commands. The invention can be applied to any type of display unit, including single-touch screens. The provision of a plurality of control elements for the same control function will give the user the opportunity of issuing the desired operating command quickly and reliably.

Also suggested is a control device for at least one laboratory apparatus, wherein the control device preferably comprises a housing arranged spatially separate from the at least one laboratory apparatus. The control device can be connected to a plurality of laboratory apparatuses, such as, for example, a plurality of mixers, centrifuges, bioreactors etc., in order to be able to control or operate this centrally. The connection or networking of the apparatuses can also be achieved wirelessly (for example via a WLAN).

Particularly advantageous embodiments of the invention may be derived from the subclaims:

According to these, it is advantageous for the at least two control elements to be embodied to set the same parameter for different operating techniques, in particular for operating techniques with which the operator of the control device executes a tapping, swiping or pointing movement. This enables the user always to execute the desired operating command quickly and reliably. For example, the operator can use a control element for "tapping" if the command input using, for example, a "swiping movement" with a moist laboratory glove would not be successful.

In one advantageous embodiment, the at least two control elements comprise at least two of the following differently embodied control elements: slide control, rotary control, key, rocker, switch and stepping switch. It has been found that these control elements embodied as soft controllers or soft buttons are particularly user-friendly.

Preferably, the at least two control elements are embodied differently to set one of the following parameters: temperature, speed, rotational speed, acceleration, duration or valve setting etc. For example, the temperature can be entered by a first control element in the form of a slide control and alternatively by a second control element in the form of a key, a rocker or the like.

Preferably, the at least two control elements are assigned to one of the following control functions: control of an electric motor, control of a heating and/or cooling element, control of a measuring device. In this context, it is advantageous for the laboratory apparatus to be embodied as a centrifuge, thermocycler, spectrometer, Shaker, ULT freezer, or $CO_2$ incubator. Other examples mentioned are mixers and small laboratory apparatuses. The invention is not restricted to the operation of laboratory apparatuses in the narrower sense but is generally suitable for use in all apparatuses that have to be operated under laboratory-like or laboratory-type conditions, such as, for example, bioreactors.

In a preferred embodiment of the invention, the display unit is configured such that the plurality of control elements is displayed within a control panel in an at least partially interleaved arrangement. In this case, the different setting options for the same parameter (for example rotational speed) are displayed in a compact arrangement resulting in a very clear display when a plurality of parameters has to be set. This is because this embodiment enables a plurality of groups of control elements to be displayed on the screen each of which is used to set a specific parameter.

The laboratory apparatus is preferably embodied such that the display unit displays a plurality of the parameters to be set within a display panel, wherein the display panel displays the parameter which is currently being set as highlighted relative to the other parameters. As a result, the parameters to be set or essential parameters such as, for example, temperature, rotational speed, duration, are displayed on the screen so that the user can acquire all essential information at a glance, wherein the parameter to be set or currently being set is displayed in a highlighted manner. In this context, it can additionally be provided that the display unit also displays at least one of the control elements. Hence, it is possible directly next to a parameter display, also to display control elements, such as, for example, plus-minus keys in order to be able change the parameter directly at the position of the parameter display. Alternatively or additionally thereto, it can be provided that the control panel also displays at least one of the parameters, in particular the parameter that is currently being set. Accordingly, parameters and control elements can be displayed together next to each other in the control panel. The control panel and display panel virtually merge with each other.

Even if the terms "control panel" and "display panel" initially refer to display areas, which are used either for the operation of the apparatus, that is control elements, or for displaying display elements, in particular parameters and information, the respective areas can in each case also have elements of the other area. It is not necessary to maintain a strict separation between a control panel and a display panel. There can be a partial or even complete merger so that control elements and display elements are arranged directly next to each other in the same area of the display.

As far as the display of parameters is concerned, a further option for the display when no adjustment of a parameter is taking place, i.e. the laboratory apparatus is executing a program or a program is running there, is for the parameter which represents the essential parameter for the laboratory apparatus always to be shown highlighted. This could, for example, be preset in a basic setting of the apparatus. For example, the rotational speed for a centrifuge or the temperature for a freezer is displayed. This could be defined in the apparatus's basic setting or factory setting or could also be specified individually by the user.

It is also advantageous for the display unit to display the control elements in an arrangement which is dependent on the parameter currently being set. Here, it is particularly advantageous for a graphic/metaphorical relationship with the physical parameter to be established and/or for the display to be linked to a control element known from history (for example "fever thermometer" and rotary control to set the temperature). This adapts the display of control elements for the respective parameter in an optimum way. For example, the display of control elements for setting the temperature includes a slide control along a temperature scale and a rocker or optionally a numerical key input, while the display of control elements for setting the rotational speed includes a rotary control and a stepping switch enabling changes to the rotational speed in, for example, steps of 1, 10, 100 and 1000. It is also possible, for example, for the number of the control elements to be dependent on the parameter to be set in each case.

It can be advantageous for the display unit to change the position of one or more of the control elements on the display panel depending on the value of the parameter currently being set. If the parameter is changed significantly, this can be indicated in that that the parameter is displayed at a particularly exposed position on the screen.

The invention and the advantages resulting therefrom will now be described in detail with reference to exemplary embodiments, wherein reference is made to the attached drawings showing the following schematic representations:

Figure 1A:
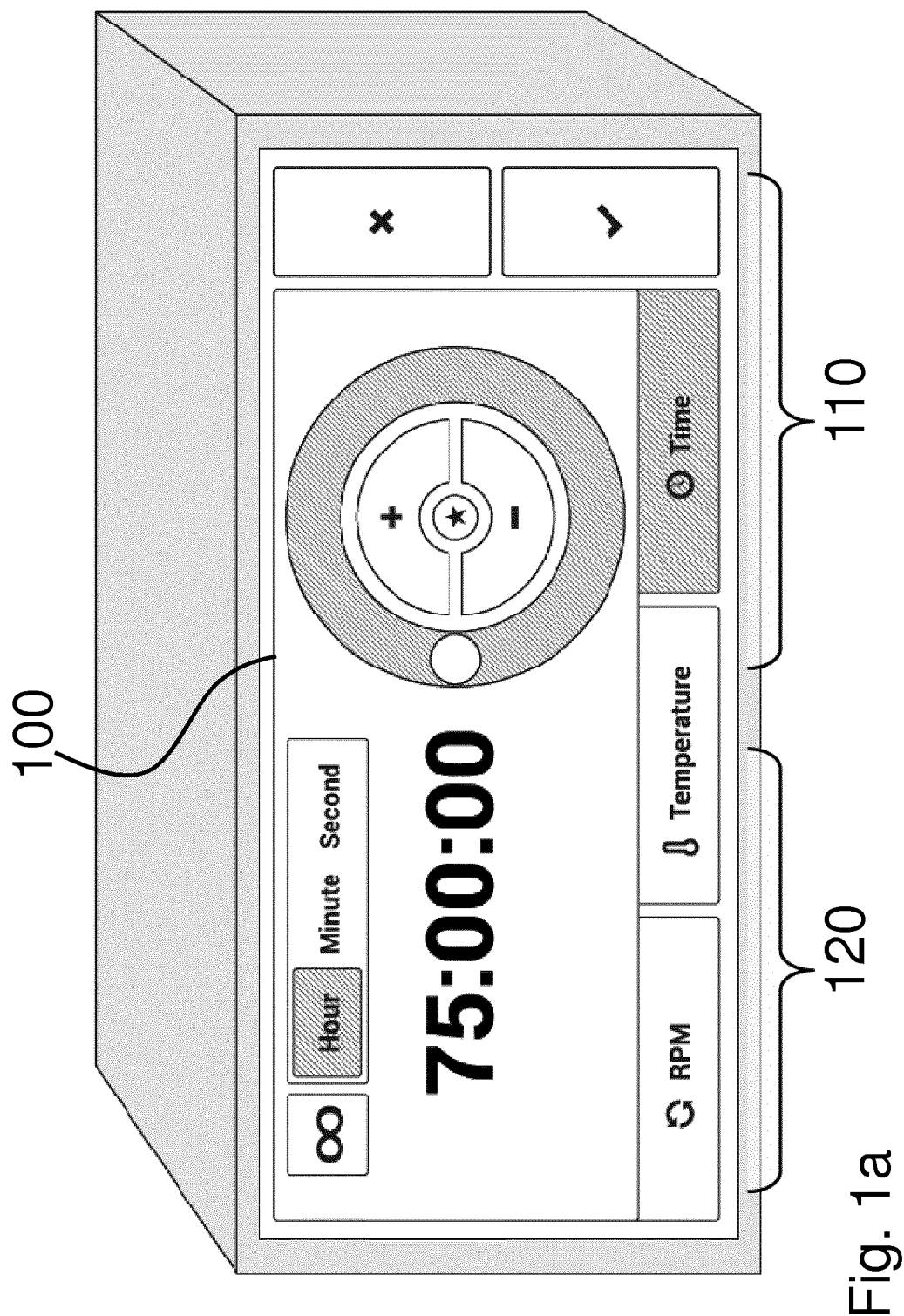
FIG. 1a shows as a first exemplary embodiment a laboratory apparatus embodied as a centrifuge comprising the a control device with a display unit according to the invention.
Figure 1B:
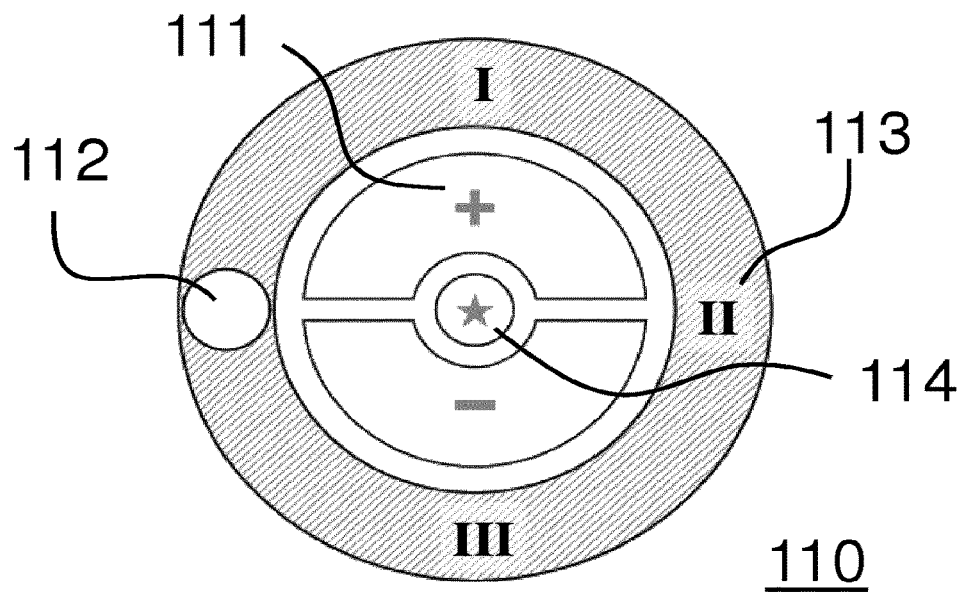
FIG. 1b shows a control panel of the display unit in FIG. 1a comprising a plurality of control elements in detail.
Figure 3:
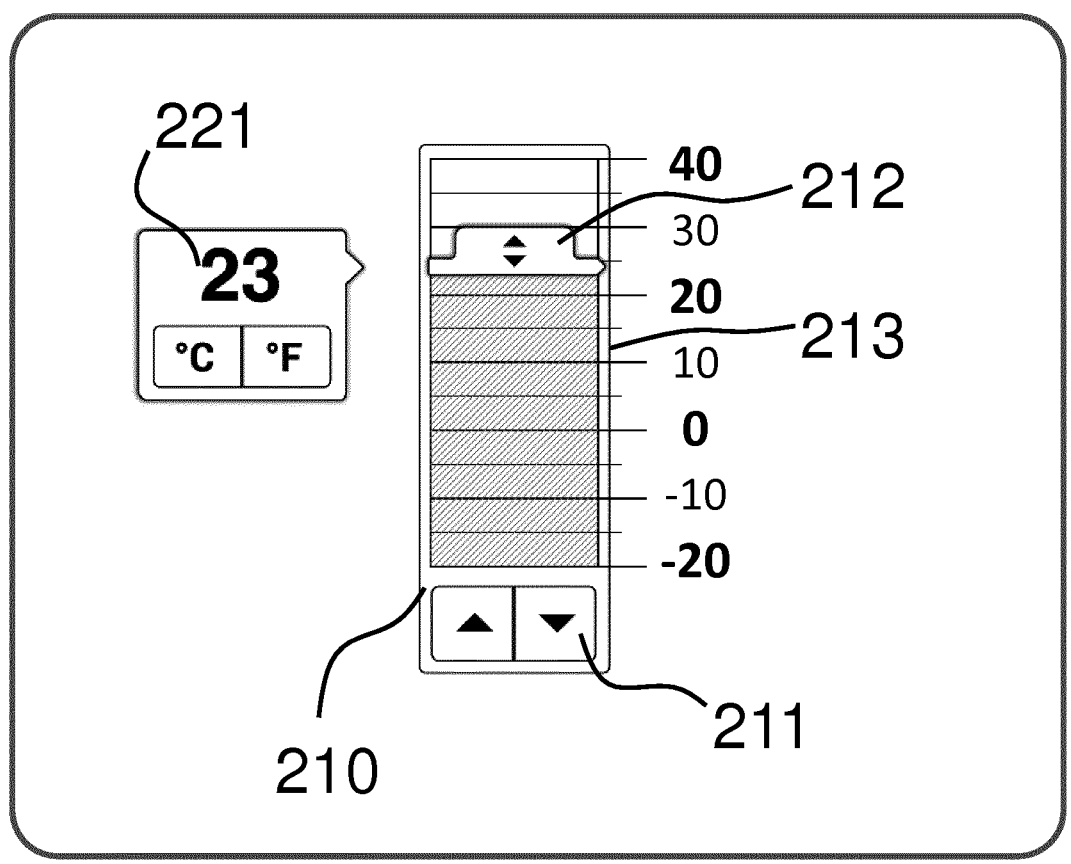
Figure 4A:
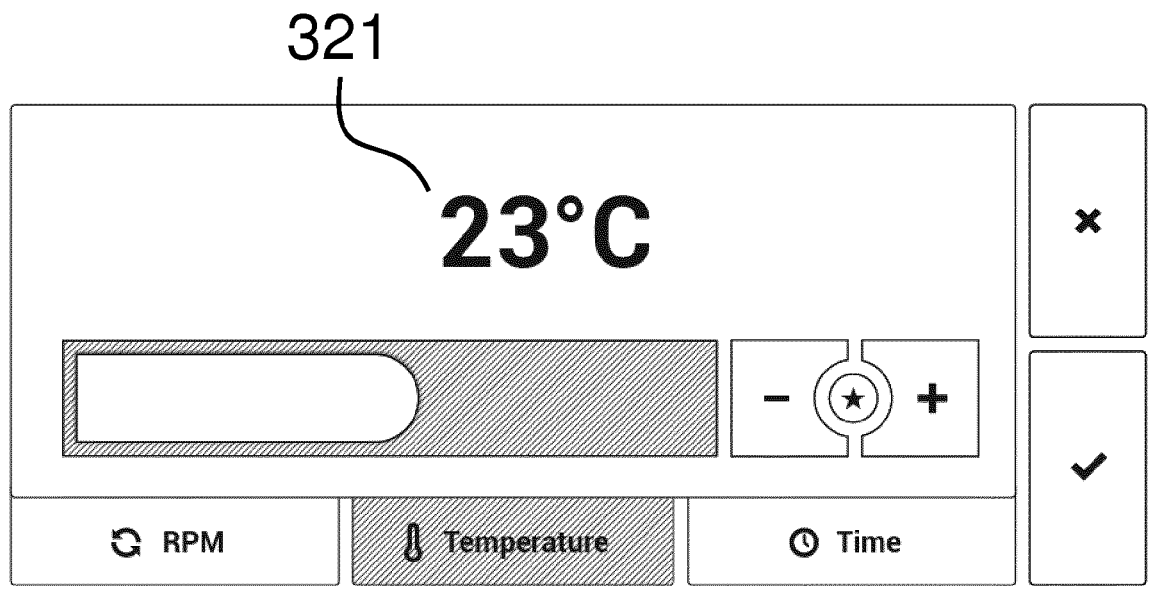
Figure 4B:
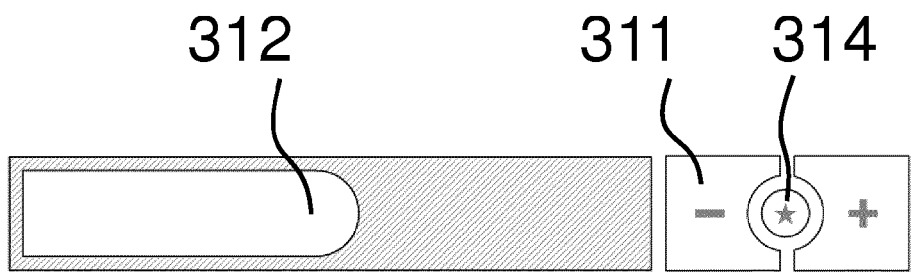
Figure 6:
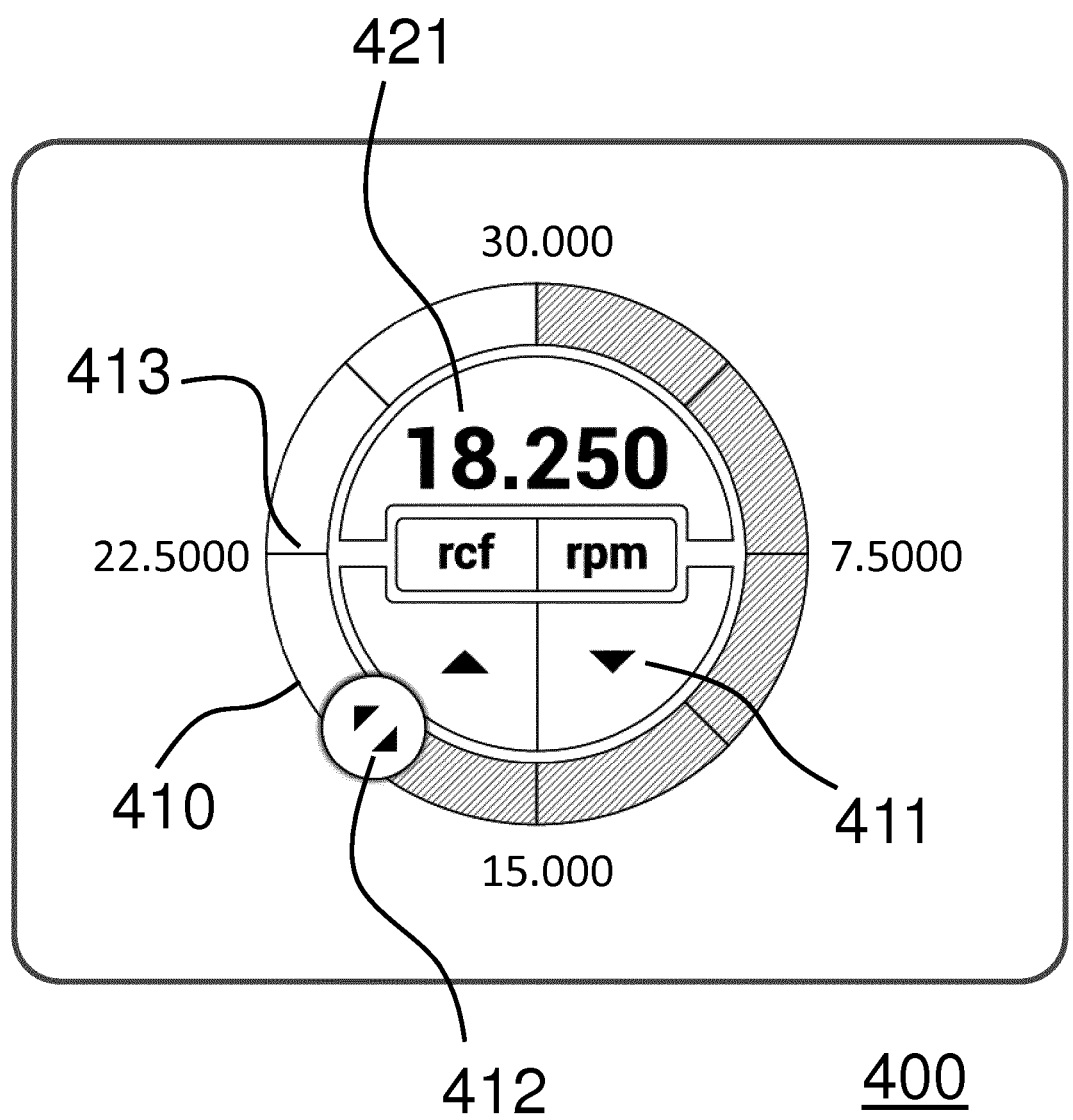
Figure 7:
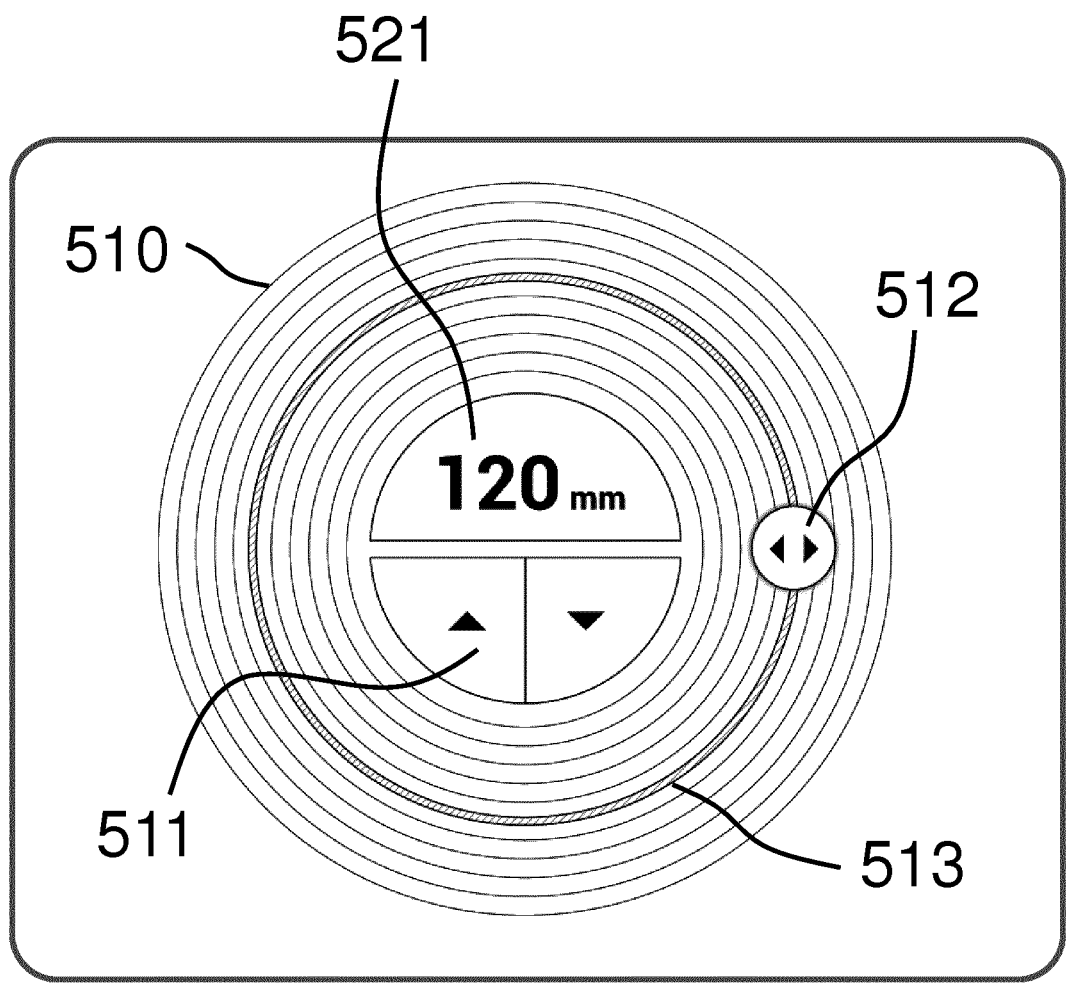
Figure 8:
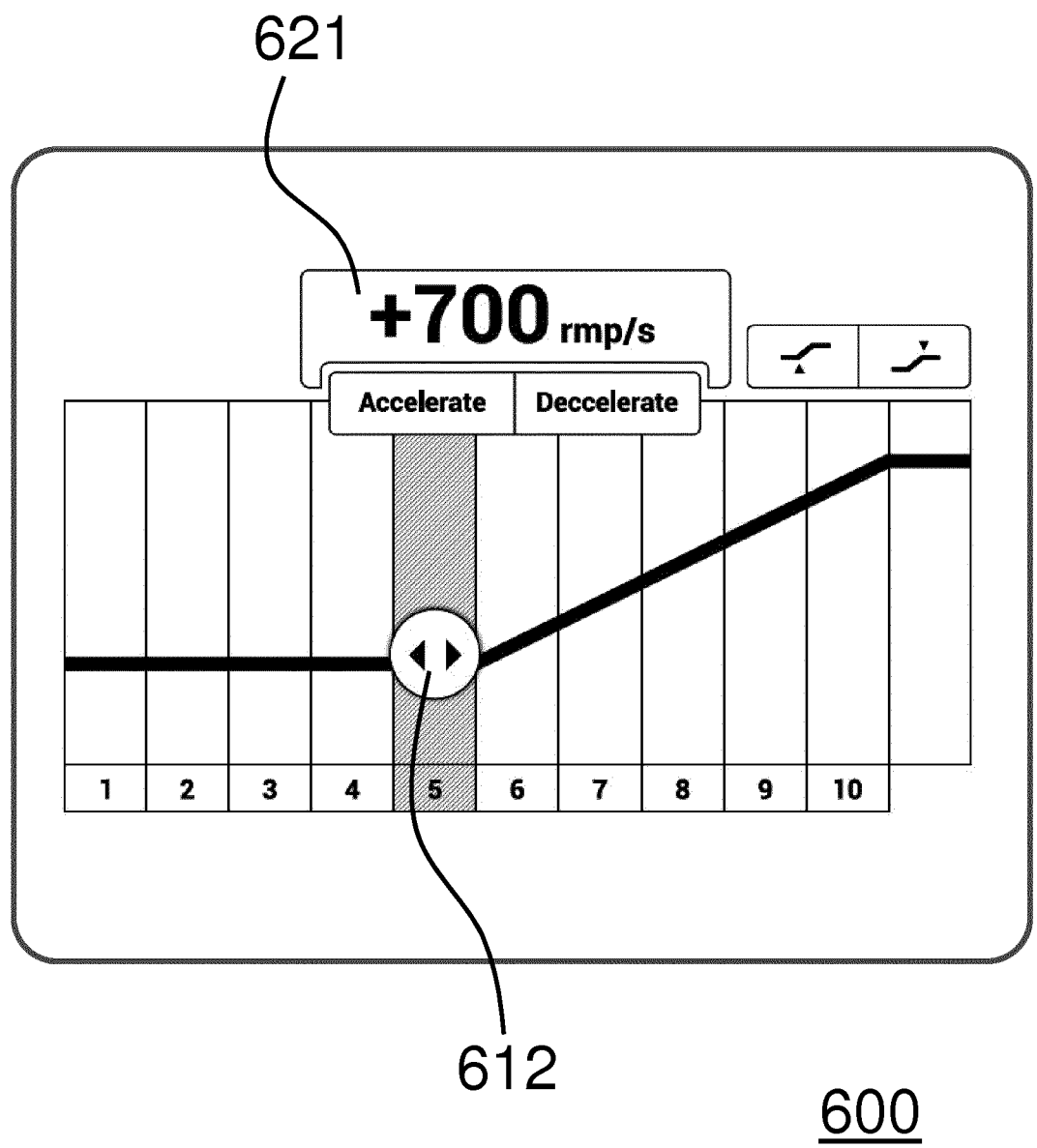
Figure 9A:
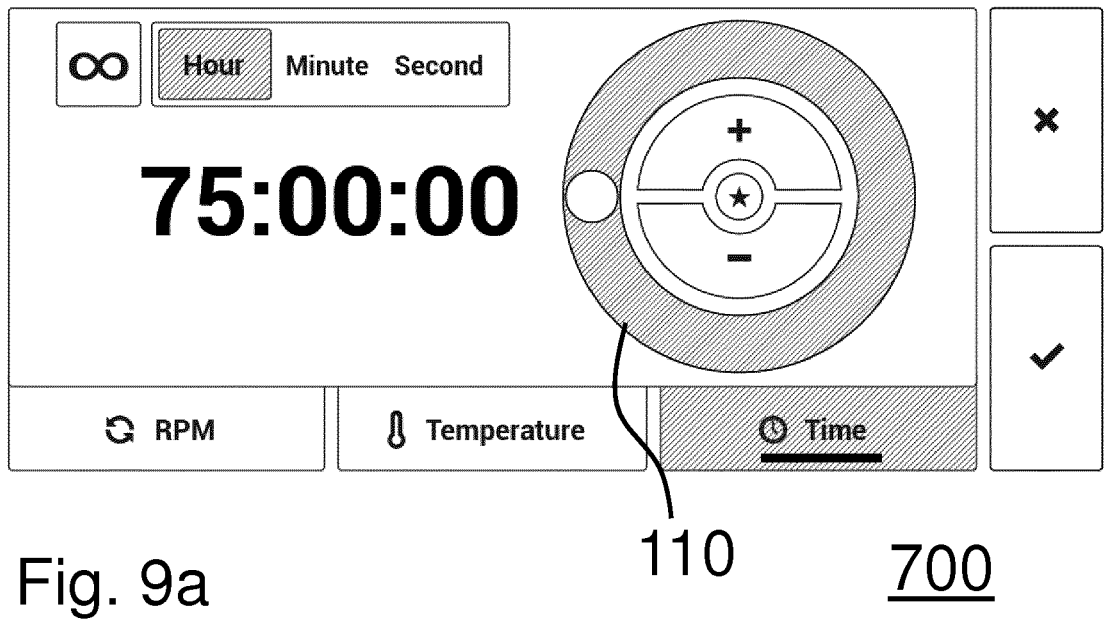
Figure 9B:
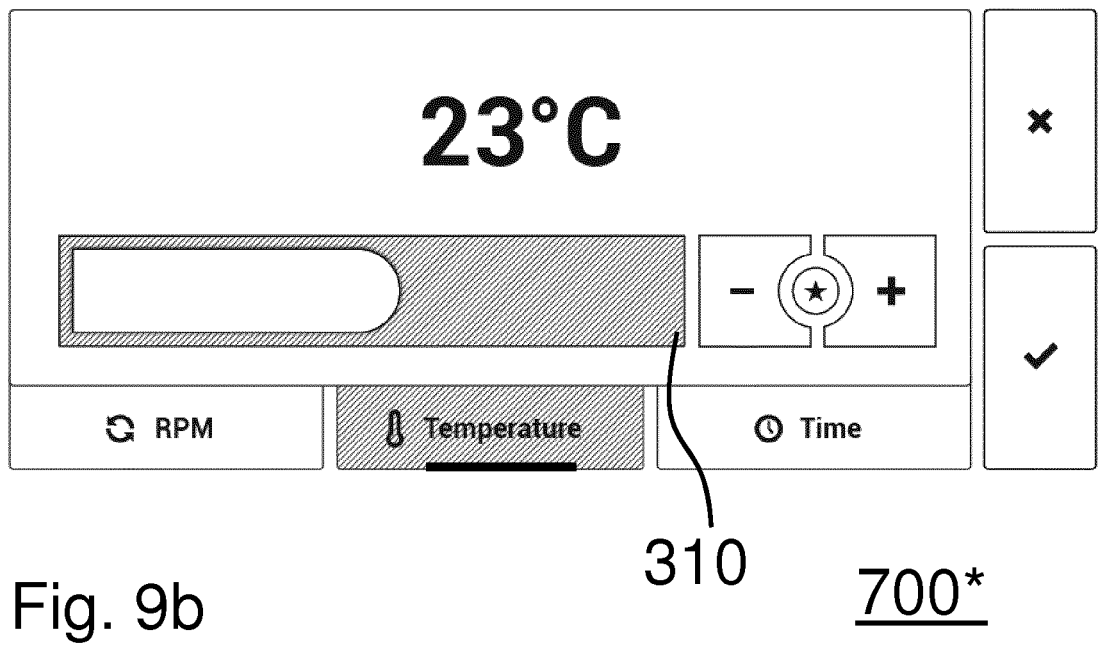
Figure 10A:
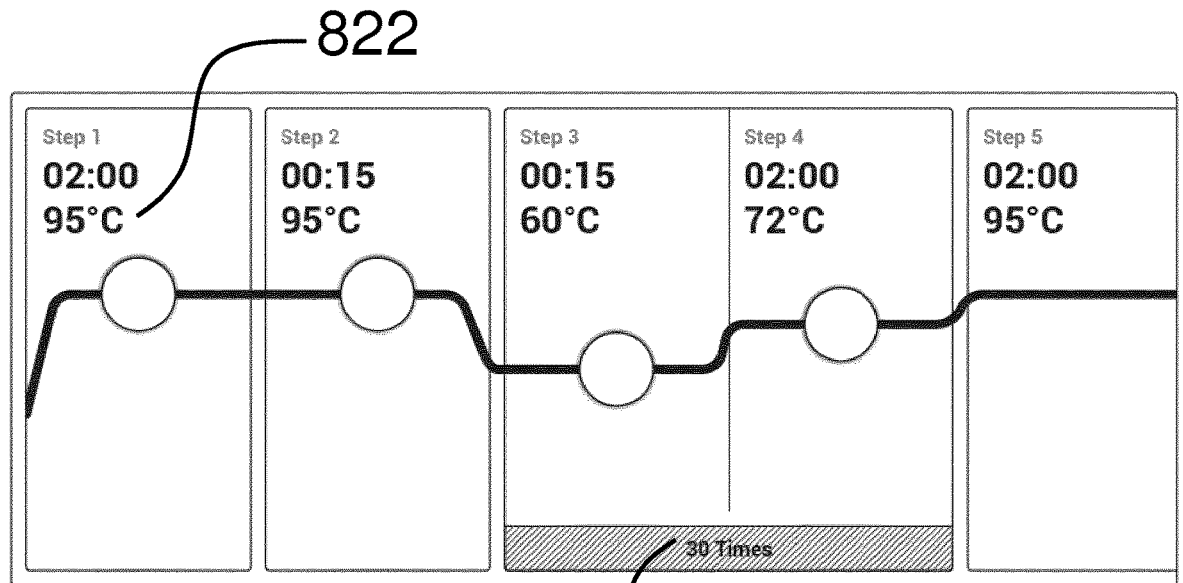
Figure 10B:
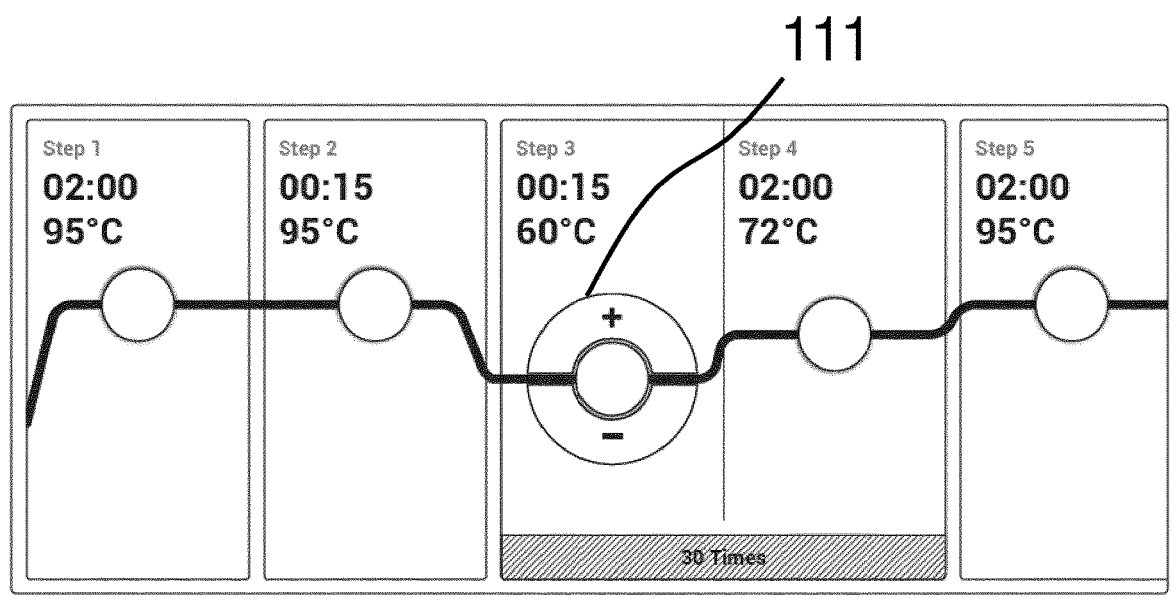
Figure 10C:
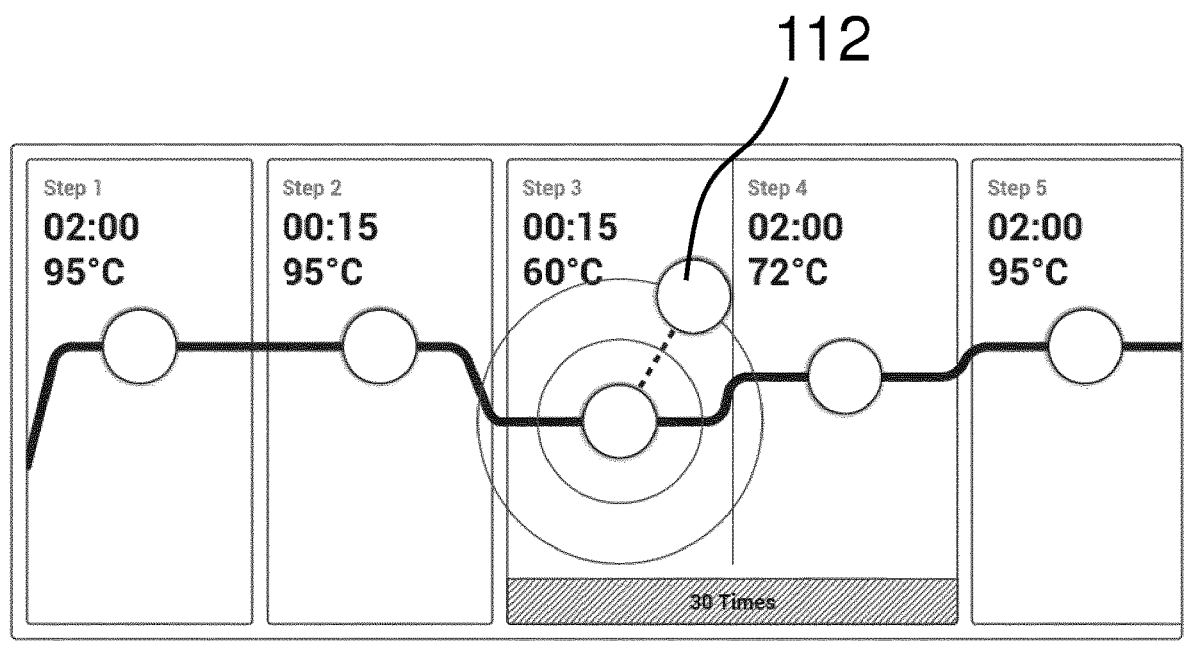

FIG. 2a-e illustrate the manipulation of the different control elements in FIG. 1b for setting a rotational speed parameter;

FIG. 3 shows as a second exemplary embodiment a display unit comprising a plurality of control elements for setting a temperature parameter and a display of the parameter value;

FIG. 4a shows as a third exemplary embodiment and, in comparison to FIG. 3, another display unit comprising an alternative arrangement of a plurality of control elements for setting a temperature parameter and a display of the parameter value;

FIG. 4b is a schematic view of the control elements of the display unit shown in FIG. 4a;

FIG. 5a-e illustrate the manipulation of the different control elements in FIG. 4b for setting the temperature parameter;

FIG. 6 shows as a fourth exemplary embodiment a display unit comprising a plurality of control elements for setting a rotational speed parameter and a display of the parameter value;

FIG. 7 shows as a fifth exemplary embodiment a display unit comprising a plurality of control elements for setting a radius parameter and a display of the parameter value;

FIG. 8 illustrates a setting for the time-controlled changing of parameters in the form of gradients or ramps;

FIG. 9a-b show variants of further exemplary embodiment relating to a PCR thermocycler; and FIG. 10a-c illustrate the setting of a temperature-curve shape on a PCR thermocycler of this kind.

Figure 1C:
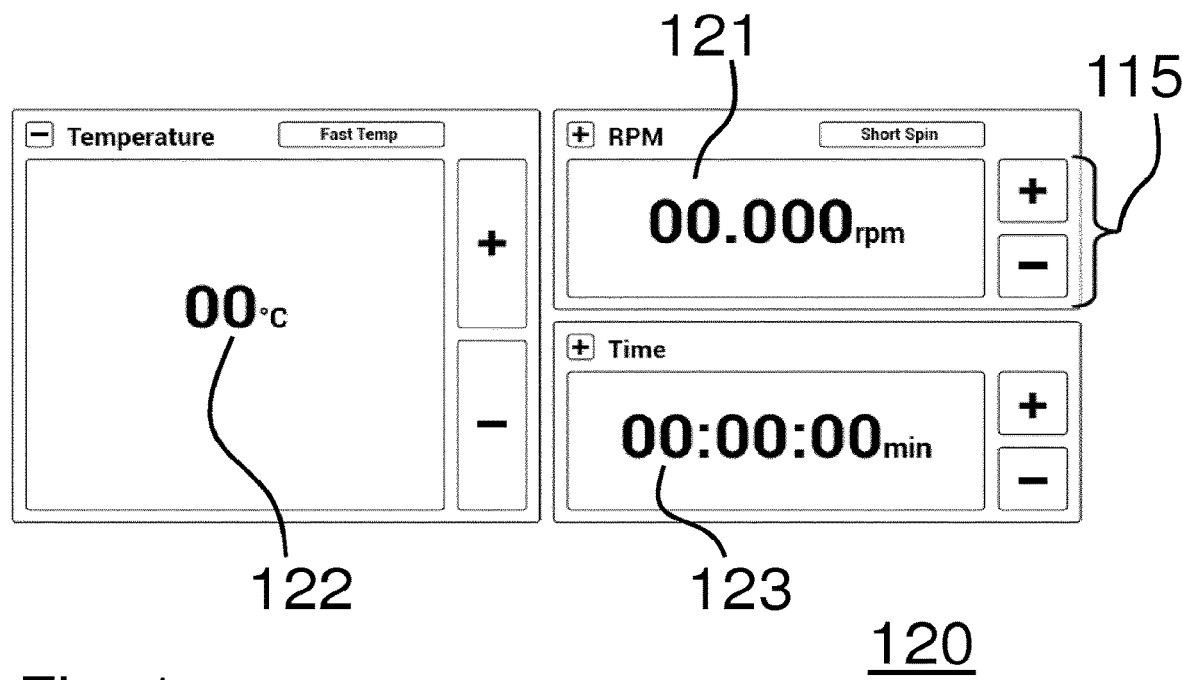
FIG. 1c shows a display panel of the display unit in FIG. 1a displaying a plurality of parameters in detail.

Here, a laboratory apparatus embodied as a centrifuge is described as a first exemplary embodiment of the invention with reference to the attached FIGS. 1a-c. The centrifuge 100 shown schematically in FIG. 1 comprises a control device with a display unit according to the invention 100, which is embodied as a multi-touch screen and is able to recognise user inputs including in the form of gestures. In FIG. 1a, the display unit 100 is illustrated by way of example for numerous possible configurations such that it comprises a control panel 110 and a display panel 120. It is also possible to display a plurality of control and/or display panels or interleave these at least partially in one another, as will be described later. FIGS. 1*b* and 1*c* each show an example in detail to illustrate the basic structure and the basic functions of control fields and display fields. As can be seen there, it is not necessary to maintain a strict separation between the control panel and display panel. It is possible for them to be partially or even completely merged so that control elements and display elements are arranged lying directly next to each other in the same area of the display.

FIG. 1*b* shows a control panel 110, which is used to control the centrifuge motor functions, in particular for setting the rotational speed and by way of example four differently embodied control elements 111-114. Soft keys in the form of plus minus keys, with which the current rotational speed can be increased or reduced in steps are provided as a first control element. Consequently, these soft keys also have the function of a rocker switch, which can, for example, increase or reduce the rotational speed by 1 revolution per minute. The step size does not have to be 1 revolution per minute, but can, depending on the application, also be preset and for example equal 100 revolutions per minute. It is also conceivable for the step size to be changed dynamically and made dependent on the length of time (duration) for which the control element is pressed. The second control element 112 is shown as a rotary control or circular slide control, which is set by means of a sliding movement along the circular slide path and the resulting change to the position of the control element 112. It is also possible for numerical values or symbolic values such as "I", "II" and "UI", which each represent a specific rotational speed step, such as, for example, I=1000, II=1500 and III=2000 revolutions per minute, to be displayed on the circle. The rotational speed parameter is set to the corresponding value by directly tapping on the desired symbolic value. Hence, this is a further control element 113 which has the function of a step switch. Sectorisation into a plurality of areas I, H, III etc. is not always advantageous. In many applications, it is more advantageous for it to be possible to tap everywhere on the circle of the slide control (radial slider) in order make apresetting. The spatial arrangement and orientation of control elements and the number thereof is variable and does not necessarily have to correspond to the arrangement shown here. For example, control elements 111 could also be arranged rotated by 90°.

A further control element 114 can take on the function of a favorite button, with which the parameter can be set to a favorite value. The favorite value can, for example, he set by pressing on the desired place (desired parameter value) for a long time. It is also conceivable that pressing on the favorite button causes a list with the last n settings (for example n=5) to be displayed for selection. The manipulation of the different control. elements 111-114 will be described in more depth and in detail with reference to FIG. 2*a-e*.

FIG. 1*c* initially shows a further embodiment for a display panel according to the invention 120, which displays a plurality of parameters to be set 121-123 and which also comprises control elements 115 with each of which one of the parameters can be set or changed. As a first parameter 121, the rotational speed of the centrifuge currently set is displayed, for example, in a first panel. Next to the panel, there are control elements 115 in the form of, for example, plus-minus keys or graphical symbols (up/down arrows etc.), by means of which the parameter can be directly changed. The user does not necessarily have to change to the control panel 110 (see FIGS. 1*a* and 1*h*) and has the set parameter 121 and the adjusting keys 115 directly in view. The temperature 122 and the time 123 are also shown here as further parameters. Here, the plurality of parameters are depicted in panels arranged next to each other, but other forms of presentation are also possible.

As illustrated by FIG. 1*c*, at least one of the parameters can be optically highlighted in the display, such as, for example, by displaying the parameter in an enlarged panel. Preferably, the parameters highlighted are those that are currently being changed or were most recently changed. It is also advantageous to highlight the "essential parameters" of the apparatus, which can optionally be defined by the user. In this case of a centrifuge, this can, for example, be the rotational speed.

Figure 2A:
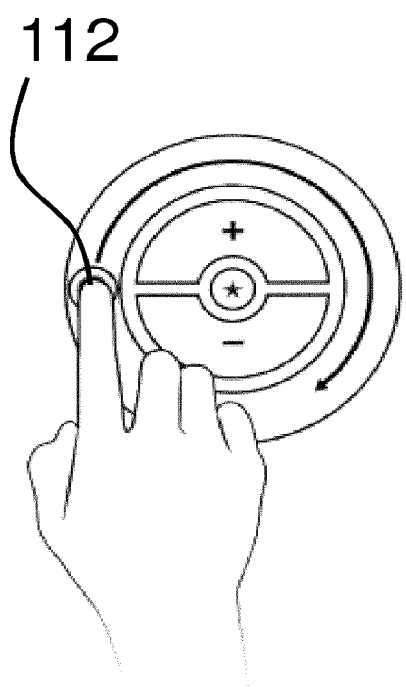
Figure 2B:
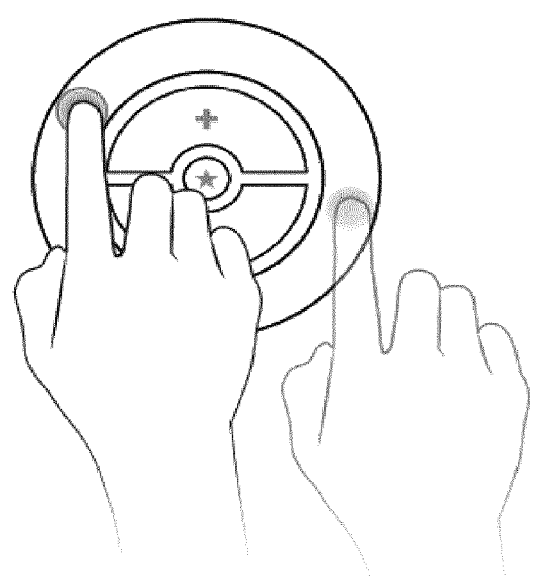

The manipulation or operation of the different control elements will now be described in more detail with reference to FIGS. 2*a-e*:

FIGS. 2*a* and 2*b* relate to the operation of the rotary control 112, wherein in FIG. 2*a* the control element 112 is simply slid so that the rotational speed can be regulated continuously up or down. FIG. 2*b* shows that it is also possible to jump immediately to a new setting point by directly tapping on a point on the circular slide path. The value of the setting point selected in each case is shown in the display so that the user is able to check precisely the target value to be reached by the regulation. The control element 112 in the form of a circular rotary control occupies relatively little space on the display unit, but is able to implement at least the two control functions mentioned "sliding" and "tapping". The step size can also be set or changed dynamically depending on the speed of the finger movement (gesture).

Figure 2C:
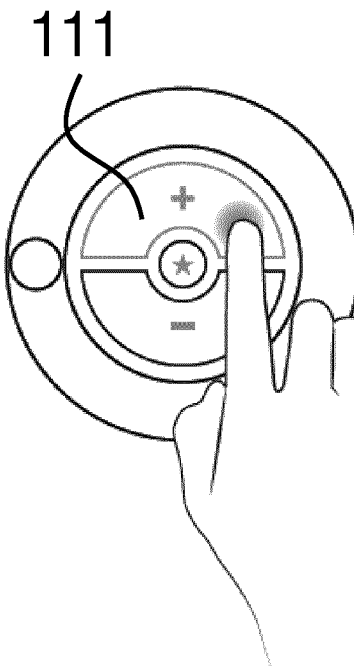
Figure 2D:
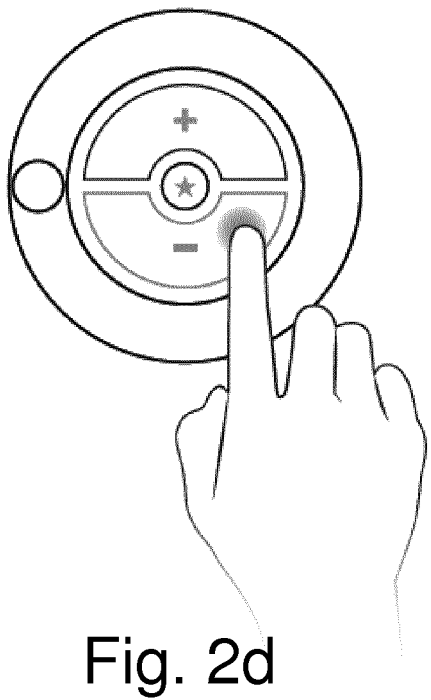

FIGS. 2*c* and 2*d* relate to the operation of another control element 111 or a group of control elements consisting of a plus key and a minus key, which are located in the interior of the circular slide path in control panel 110. Instead of +/− symbols, it is also possible to display other suitable symbols (for example up/down arrows). These keys are used to increment or decrement the parameter, here the rotational speed. To this end, the user presses the plus key (FIG. 2*c*) or the minus key (FIG. 2*d*). In this case, the step size can change dynamically and, to be precise, depending on the duration for which the key is pressed. The longer the user presses the key, the larger the step size.

As FIGS. 2*a-c* and FIG. 1*b* show, it is possible for a plurality of control elements 111-114 to be interleaved, for example in a ring, in order to obtain a very compact display of the different control elements. The arrangement of the control elements saves space but is nevertheless very clearly laid out. The individual control elements are arranged so they are clearly distinguishable. Hence, the user can specifically reach the desired control element and operate it reliably.

Figure 2E:
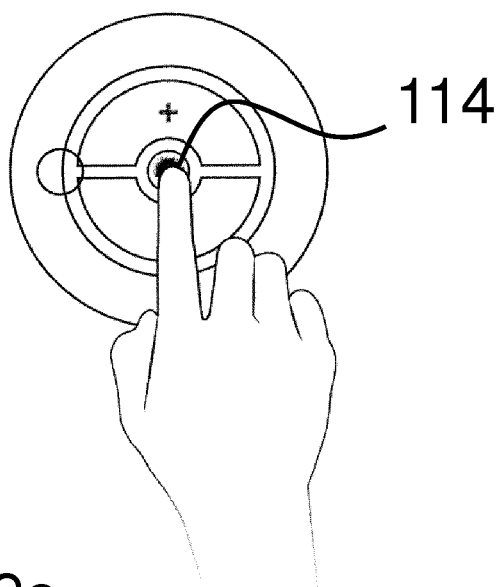

FIG. 2*e* shows a further control element 114 which performs the function of a favorite button or a reset key. When the user presses this key 114, the parameter jumps to a predetermined value, for example to a standard rotational speed value. The value can, for example, be dependent on the apparatus and/or specified by the user. It is also possible for a plurality of favorite values to be set. The actual favorite values(s) can, for example, be set by pressing on the position (desired parameter value) for a long time.

As FIGS. 2*a-e* illustrate, the same parameters, here the rotational speed of a centrifuge, can be set and changed via different control elements. Depending on the situation, the user can actuate the most suitable control element in each case. If, in one situation, a control element can only be operated with difficulty, because, for example, the user is wearing laboratory gloves, the user is also able to select and actuate one of the alternative control elements offered immediately. The probability of faulty operation and/or temporal delay during the operation of the laboratory apparatus is significantly reduced.

The display of the control elements is preferably implemented by means of a multi-touch screen and can be adapted to the current situation, i.e. for example to the process sequence, to the respective user, to the respective parameter to be set and to much else. For example, the display adapts to whether the user is right-handed or left-handed. The display unit is preferably a touch-sensitive display with which the display panel and control panel can be flexibly configured to take account of an extremely wide variety of everyday requirements encountered in laboratories. Here, a separation of the display panel 120 and control panel 110 is not necessarily required (see FIG. 1a); it is also possible for interleaving or merging to achieve a single display and control field (see in particular FIGS. 6 and 7).

The configuration of the man-machine interface suggested here can also be embodied in accordance with the wishes of the manufacturer of the laboratory apparatus such that laboratory users recognise a basic structure during the operation of the laboratory apparatuses from this manufacturer and hence are able to operate the laboratory apparatuses easily and use them reliably even for different laboratory processes. A clear and recognisable structure makes everyday laboratory practice simpler and quicker.

The control elements also permit the control of laboratory apparatuses by means of gestures. The control takes place with reference to detectable interaction patterns by means of the touch-sensitive display unit, which is embodied, for example, as a multi-touch screen (touch-sensitive, full-graphics display with gesture recognition).

Examples of parameters to be could be: temperature; speed, for example in the case of centrifuges, the rotational speed/centrifugal acceleration; the duration, for example duration of centrifugation; rotor radius in the case of centrifuges. It is also possible to set gradients and ramps, for example the start-up and braking ramp in the case of centrifuges.

There now follows, with reference to FIG. 3-5, a description of further exemplary embodiments with which the temperature of a laboratory apparatus can be set.

FIG. 3 shows a display unit 200 comprising a plurality of control elements 211-213 for setting a temperature parameter 221 and a display of the parameter value. The display unit 200 shows in an integrated manner the elements of a display panel and of a control panel. The display of the temperature is shown as a numerical value, wherein it is possible to switch between Celsius and Fahrenheit. The control elements provided are up-down keys 211, a slide control 212 and a tappable scale 213. If the temperature value is now changed by means of the control elements, this appears immediately on the temperature display.

The actuation of a control element also optionally has impacts on the depiction of another control element. If, for example, the temperature on the scale 213 is changed by tapping the scale value 25° C., the position of the slide control 212 also changes to precisely this value.

FIGS. 4a and 4b show, as a third exemplary embodiment, a display unit 300 comprising an alternative arrangement of a plurality of control elements for setting a temperature parameter 321 and a display of the parameter value. FIG. 4b shows in a simplified schematic view the arrangement of a slide control 312 comprising plus-minus keys 311 and a reset or favorite key 314.

Figure 5A:
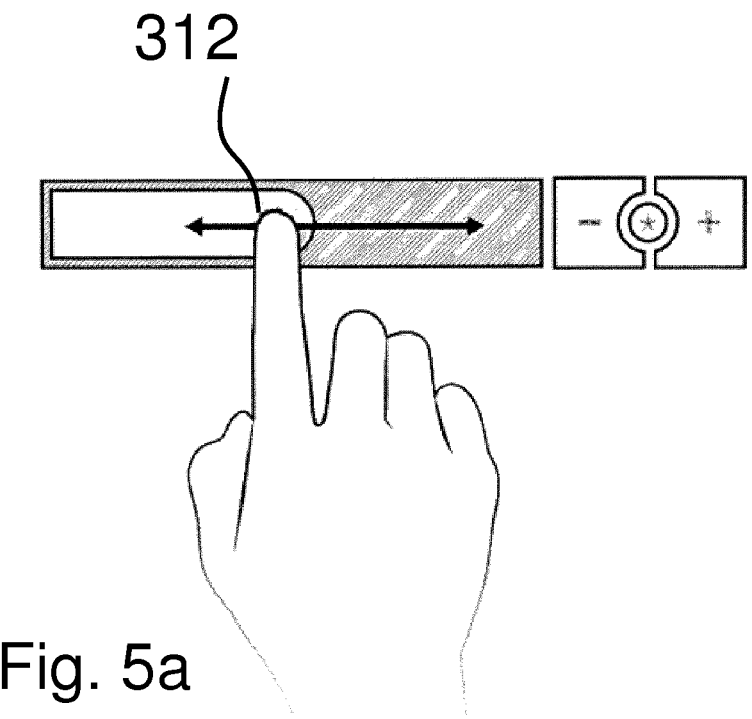
Figure 5B:
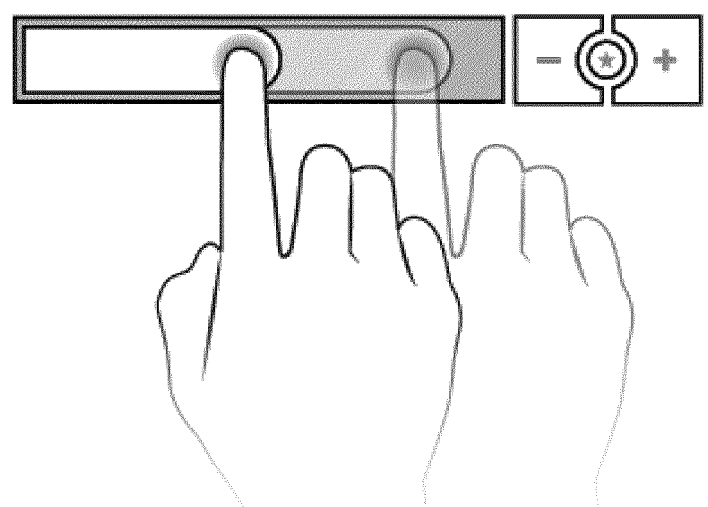

The manipulation of these different control elements, which are all used to set the same temperature parameter 321 is illustrated by FIGS. 5a-e:

FIGS. 5a and 5b relate to the operation of the slide control 312, wherein in FIG. 5a there is a simple sliding of the regulator so that the temperature can be regulated continuously up or down. FIG. 5b shows that it is also possible to jump immediately to a new setting point by directly tapping on a point on the linear slide path of the regulator. Accordingly, the control element 112 can at least implement the two control functions mentioned "sliding" and "tapping".

Figure 5C:
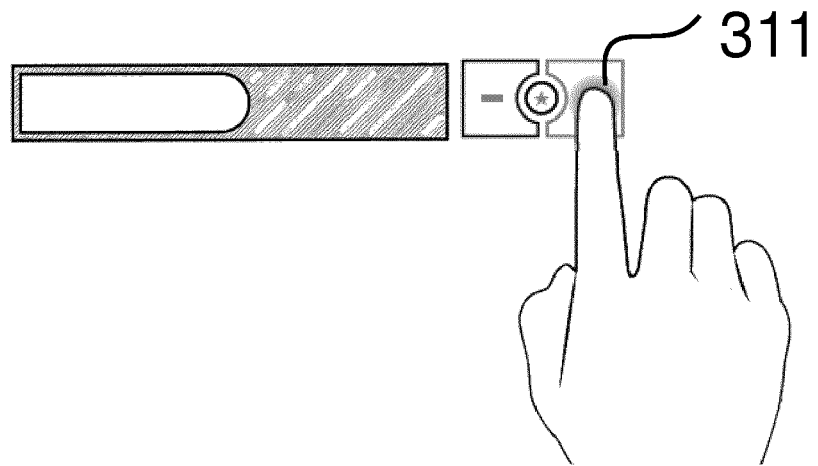
Figure 5D:
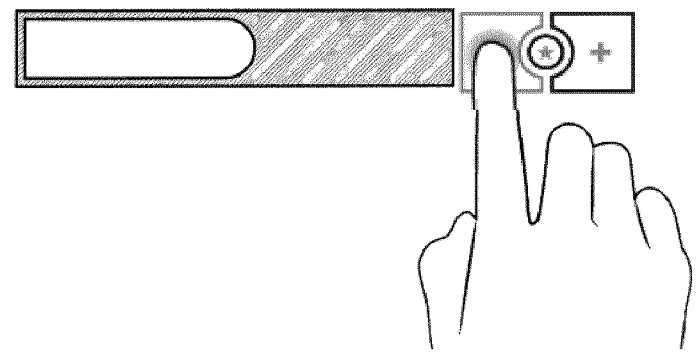
Figure 5E:
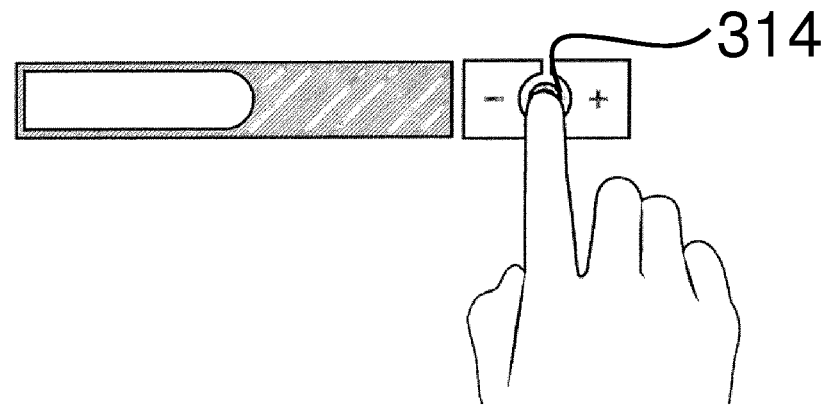

FIGS. 5c and 5d relate to the operation of the plus-minus keys 311, which are located next to the slide control 312. The keys 311 can be used to increment and decrement the temperature in that the user presses the plus key (FIG. 5c) or the minus key (FIG. 5d). Between these two keys 311, there is a further control element in the form of a reset key or favorite key 314 with which the temperature can be set to a prespecified value, such as, for example, room temperature 20° C. It is also possible to offer a plurality of favorite values. Or the resetting is always to the value most recently set. Numerous further variants are conceivable.

FIG. 6 shows as a fourth exemplary embodiment a display unit 400 comprising an integrated display and control panel. This example also shows a plurality of control elements for setting a rotational speed parameter 412 and a display of the parameter value. The control elements offered to the user for selection are a rotary control 412, up-down keys 411 and a tippable scale 413. The arrangement of the control elements so-to-speak encompasses the parameter display and hence results in a very compact user-friendly display. The user sees all the control elements and the parameter display at a glance.

FIG. 7 shows as a fifth exemplary embodiment a display unit 500 with a plurality of control elements for setting a radius parameter 521 in the case of a centrifuge. The control elements offered are a slide control 512, up-down keys 511 and a tappable circular area 513. The tappable surface shows a plurality of concentric rings each of which represents a specific radius value. This shows the user very clearly the setting options for the parameter "radius". If the user taps on an outer ring, a larger radius is set than when the user taps on a small radius.

FIG. 8 shows a display unit 600 for the process control with which the parameter 621 "rotational speed" is set or changed in accordance with a presettable curve shape. The curve shape comprises constant segments and rising or falling ramps. The control element displayed is a slider 612, with which the start, end and rise of ramp can be defined. Further switches enable the change to the ramp or from the ramp to be embodied more or less softly. This enables very user-friendly setting of gradients and ramps, for example the start-up and braking ramp in the case of centrifuges and the temperature curve in the case of PCR apparatuses.

With reference to FIGS. 9 and 10, which refer to a PCR thermocycler, the following describes further variants of the man-machine interface according to the invention. The PCR thermocycler, also called a PCR cycler for short, is a laboratory apparatus, which controls the so-called polymerase chain reaction. The PCR cycler heats and cools the reaction vessels contained therein to precisely the temperature required for the step in question. To this end, in particular the duration (see FIG. 9a) and the temperature (see FIG. 9b) are set. The process takes place in accordance with a presettable temperature curve the parameters of which (temperature, time) are set according to the desired course of the process (see FIG. 10a-c).

FIG. 9a shows the display unit 700 of a PCR cycler with which the duration is set by means of a control panel 110 set, which was described above in depth with reference to FIGS. 1b and 2a-e. The control panel 110 comprises inter alia a control element embodied as a rotary control with which the desired duration can be set quickly and in a user-friendly way. Individual soft keys can be used to determine whether to set the hour, the minute (minute) or the second. Alternatively to the rotary control, a rocker with up-down keys or plus-minus keys is also available. A lower display strip contains panels which display the parameters which are being set or displayed, such as here, for example, the time. To further increase the user-friendliness, it is also possible additionally for help text and/or graphic to be provided in the form of pop-ups when the user touches a specific point or panel of the touch screen, in particular for a lengthier duration (for example more than 2 seconds). For example, when the user touches the panel "time", a pop-up is displayed explaining the setting of the duration.

FIG. 9b shows the changed display unit 700*, which is used to set the temperature by means of another control panel 310, which was described earlier in depth with reference to FIGS. 4b and 5a-e. This control panel 310 comprises inter alia a control element embodied as a slide control, with which the desired temperature can be set quickly and in a user-friendly way by the linear displacement of the regulator or tapping the regulator path. Alternatively to the slide control, a rocker with plus-minus keys is also available. It is indicated on the lower display strip by the highlighting of the panel "temperature" that the temperature value is being set or displayed. A comparison with FIG. 9a shows that in each case a control panel (here 110 or 310) suitable for the parameter setting is displayed on the display unit. Accordingly, the control panel can change in accordance with the respective parameters to be set. To this end, the user can set defaults which are stored in the apparatus settings for the laboratory apparatus, in particular in the user profile. If, for example, the user wishes to set the time via the rotary control but the temperature via the slide control, he/she specifies this in the apparatus settings. This causes the display to change on the actuation of the respective function key "temperature" or "time" according to the user defaults. The defaults can also be defined at the factory.

FIGS. 10a-c also relate to the PCR cycler and illustrate how the setting of a temperature-curve shape can be performed with the aid of the control device according to the invention:

In FIG. 10a, the curve shape currently set is shown on the display unit 800. The parameter 822 "temperature" changes over the time curve, which is divided into individual segments or steps, which can be passed in multiple cycles. A cycle can also include a plurality of steps. The number of cycles is set via the parameter 823 and hence also determined total duration of the steps(s) in question, here, for example, the steps "Step 3" and "Step 4".

With reference to FIGS. 10a and 10b, it will now be explained how the curve shape can be changed by means of the man-machine interface according to the invention:

FIG. 10b shows by way of example a case in which the user wishes to change the settings for the process step "Step 3". To this end, he/she touches the corresponding area on the touch screen and then a control panel with one or more control elements is displayed. Here, for example, the previously described control element 111 "rocker" is displayed (see FIG. 1b), which has plus-minus keys. The user can now increase or decrease the temperature value by simply touching the rocker keys. The user can also increase or decrease the temperature value by moving the entire control panel up or down.

FIG. 10c shows an alternative control element 122 and, contrary to FIG. 10b, shows an option for setting the time: The user can now, for example, set the minutes by simply pressing the button and by dragging/moving on the outer circular path. Pressing the button and dragging/moving on the inner circular path is used to set the seconds. Hours are not generally required for the cycler. However, overall, there are always two setting options available: setting the temperature by means of an UP/DOWN movement of the button 110 in accordance with FIG. 10b and actuation of plus/minus for fine adjustment, wherein a change to the slider side in accordance with FIG. 9b is possible by touching the temperature display. The time is in turn set by means of the operation in accordance with FIG. 10c. Or the time setting is changed in accordance with FIG. 9a by touching the time display.

Both FIGS. 10b and 10c show that the user always has at least two alternative setting options. Hence, the user is always offered a plurality of ways for setting a parameter or for the operation of the apparatus. Preferably, the touch-sensitive display unit is embodied as a multi-touch screen, which is also able to recognise finger movements by the user, so-called gestures, as operator commands. The invention is not restricted to the operation of laboratory apparatuses in the narrower sense but is generally suitable for use in all apparatuses that have to be operated under laboratory-like or laboratory-type conditions.

As the exemplary embodiments described show, the invention achieves a particularly user-friendly metaphorical implementation of the control elements required for the operation of laboratory apparatuses taking into account the requirements for the operation of apparatuses in the conditions of everyday laboratory practice.

For example, reference is made with respect to operating metaphors by means of gesture recognition to the "rotary knob" whose use has been proved in everyday laboratory practice for temperature or time setting. In addition, a plurality of ways will always be provided for setting parameters or for the operation of apparatuses generally. For example, a plurality of operating options such as "swiping", "pointing" or "tapping" will be available simultaneously to the user. This gives the user the opportunity to issue the desired command successfully, even if, for example a "swiping gesture" would not be successful with a moist laboratory glove.

The man-machine interfaces described here can be used for any type of laboratory apparatuses. Due to the uniform basic structure, simplification of the operating principles can be transferred from apparatus type to apparatus type. The user will recognise the manufacturer's typical structure and hence learn much more quickly how to understand and operate the apparatus.

The setting of parameters can be performed much more quickly and accurately by means of multi-touch than with conventional control parts, such as buttons and regulators.

The invention claimed is:

1. A laboratory apparatus include a centrifuge, thermocycler, shaker, ULT freezer, CO2 incubator, mixer or bioreactor or fermenter and/or as an automatic laboratory machine, the laboratory apparatus having a control device comprising a touch-sensitive display unit (100), wherein the display unit (100) is configured to display a plurality of control elements (111, 112, 113 . . . ) within a control panel (110), the plurality of control elements being assigned to different control functions of the laboratory apparatus, wherein the control elements (111, 112, 113 . . . ) are embodied to set parameters (121, 122, 123) of the control functions, wherein at least two of the control elements (111, 112, 113, 114) are assigned to a same control function and are embodied differently to set the same parameter (121) of this same control function, said control functions include a control of an electric motor, a control of a heating and/or cooling element, a valve control, or a time control, and said parameters include a temperature (122), a speed, a rotational speed (121), an acceleration, a duration (123), a volume, a distance, a length, a width, a height or a radius;

wherein the display unit (100) displays the at least two control elements (111, 112, 113) in an at least partially interleaved arrangement;

wherein one of the at least two control elements is a circular slide control (112), which is continuously set by means of a sliding movement along a slide path being a full circular ring, and other control elements of the at least two control elements are located in the interior of the full circular ring, wherein, a value of a setting point selected by the one of the at least two control elements is shown in the display unit;

wherein the control panel also displays a further control element (114) inside the full circular ring taking on a function of a favorite button, with which said same parameter of said same control function can be set to a favorite value.

2. The laboratory apparatus according to claim 1, wherein the at least two control elements (111, 112, 113, 114) are embodied to set the same parameter (121) are operated by at least one of a tapping, swiping or pointing gesture.

3. The laboratory apparatus according to claim 1, wherein the at least two control elements (111, 112, 113, 114) comprise at least two of the following differently embodied control elements: slide control, rotary control (112), key (111), rocker, switch and stepping switch (113).

4. The laboratory apparatus according to claim 1, wherein the display unit (100) displays the plurality of the parameters to be set (121, 122, 123) within a display panel (120), wherein the display panel displays the parameter (122) which is currently being set as highlighted relative to the other parameters (121, 123).

5. The laboratory apparatus according to claim 4, wherein the display unit (100) also displays at least one of the control elements (115).

6. The laboratory apparatus according to claim 1, wherein the touch-sensitive display unit is embodied as a multi-touch screen.

7. A control device for at least one laboratory apparatus include a centrifuge, thermocycler, shaker, ULT freezer, CO2 incubator, mixer or bioreactor or fermenter and/or as an automatic laboratory machine, the at least one laboratory apparatus having a touch-sensitive display unit (100), wherein the display unit (100) is configured to display a plurality of control elements (111, 112, 113 etc), which are assigned to different control functions of the laboratory apparatus, wherein the control elements (111, 112, 113 etc) are embodied to set parameters (121, 122, 123) of the control functions, said control functions include a control of an electric motor, a control of a heating and/or cooling element, a valve control, or a time control, and said parameters include a temperature (122), a speed, a rotational speed (121), an acceleration, a duration (123), a volume, a distance, a length, a width, a height or a radius;

wherein at least two of the control elements (111, 112, 113, 114) are assigned to a same control function and are embodied differently for setting the same parameter (121) of this same control function, wherein one of the at least two control elements is a circular slide control (112), which is continuously set by means of a sliding movement along a slide path being a full circular ring, and other control elements of the at least two control elements are located in the interior of the full circular ring, wherein a value of a setting point selected by the one of the at least two control elements is shown in the display unit, wherein the control panel also displays a further control element (114) inside the full circular ring taking on a function of a favorite button, with which said same parameter of said same control function can be set to a favorite value.

8. The control device according to claim 7, wherein the control device comprises a housing arranged spatially separate from the at least one laboratory apparatus.

9. The control device according to claim 7 or 8, wherein the control device is connected to the plurality of laboratory apparatuses, including a plurality of mixers, centrifuges or thermocyclers, and is configured for a central operation of the plurality of laboratory apparatuses.

* * * * *